United States Patent
Yanagihara et al.

(10) Patent No.: US 7,558,471 B2
(45) Date of Patent: Jul. 7, 2009

(54) VIDEO RECORDING APPARATUS AND METHOD, AND VIDEO OUTPUT APPARATUS AND METHOD

(75) Inventors: Yukio Yanagihara, Chiba (JP); Yoshinori Shimizu, Tokyo (JP); Mitsuhiro Okano, Tokyo (JP)

(73) Assignee: Sony Corporation, Tokyo (JP)

( * ) Notice: Subject to any disclaimer, the term of this patent is extended or adjusted under 35 U.S.C. 154(b) by 1152 days.

(21) Appl. No.: 10/822,084

(22) Filed: Apr. 8, 2004

(65) Prior Publication Data

US 2004/0202455 A1 Oct. 14, 2004

(30) Foreign Application Priority Data

Apr. 10, 2003 (JP) ............................ P2003-107053

(51) Int. Cl.
*H04N 7/26* (2006.01)
*H04N 5/91* (2006.01)

(52) U.S. Cl. ......................................... 386/124; 386/46
(58) Field of Classification Search .................... 386/46
See application file for complete search history.

(56) References Cited

U.S. PATENT DOCUMENTS 5,113,441 A * 5/1992 Harada ........................ 380/223
5,671,008 A * 9/1997 Linn .............................. 348/97

2002/0191956 A1* 12/2002 Morishima et al. ............ 386/52

FOREIGN PATENT DOCUMENTS

| EP | 0 610 864 A | 8/1994 |
|----|-------------|--------|
| EP | 0 881 840 A | 12/1998 |
| EP | 1 069 782 A | 1/2001 |
| JP | 2001-024983 | 1/2001 |
| JP | 2002-320193 | 10/2002 |
| JP | 2002-325218 | 11/2002 |

OTHER PUBLICATIONS

"Digital Video Broadcasting (DVB); Specification for conveying ITU-R System B Teletext in DVB bitstreams", European Telecommunication Standard, ETS 300 472, Second Edition, Oct. 1996.

* cited by examiner

*Primary Examiner*—Oluwaseun A Adegeye
(74) *Attorney, Agent, or Firm*—Finnegan, Henderson, Farabow, Garrett & Dunner, LLP

(57) ABSTRACT

A DVD recorder is provided which includes an NTSC decoder (15) for converting an NTSC-based TV signal into an ITU-R BT. 601-based video signal, an MPEG encoder (17) for encoding the ITU-R BT. 601-based video signal into an MPEG-2 data stream, a driver (23) for recording the MPEG-2-based data stream to a DVD disk, and a VBI slice circuit (24) for detecting VBI from the TV signal. When the V timing of an input signal is asynchronous with that of recording signal, the MPEG encoder (17) inserts null data as blanking data into an arbitrary frame if a frame repeat has occurred or deletes null data from blanking data from an arbitrary frame if a frame skip has occurred.

24 Claims, 4 Drawing Sheets

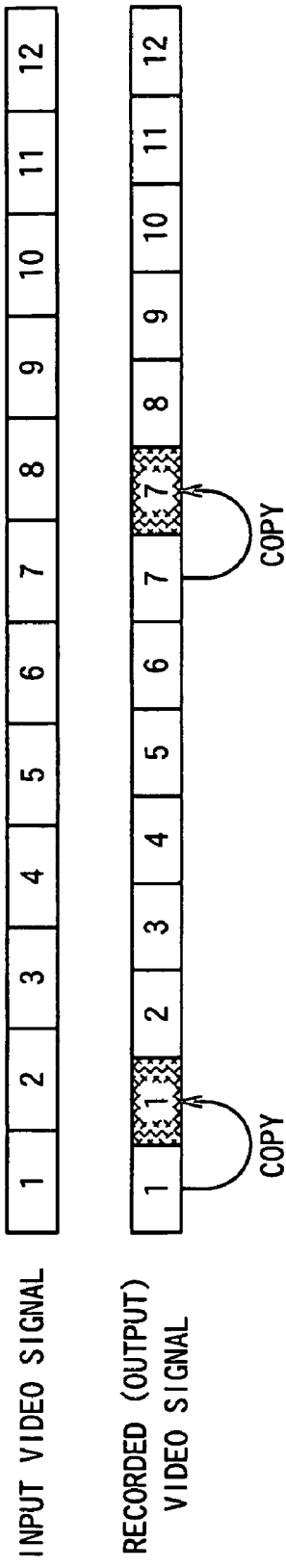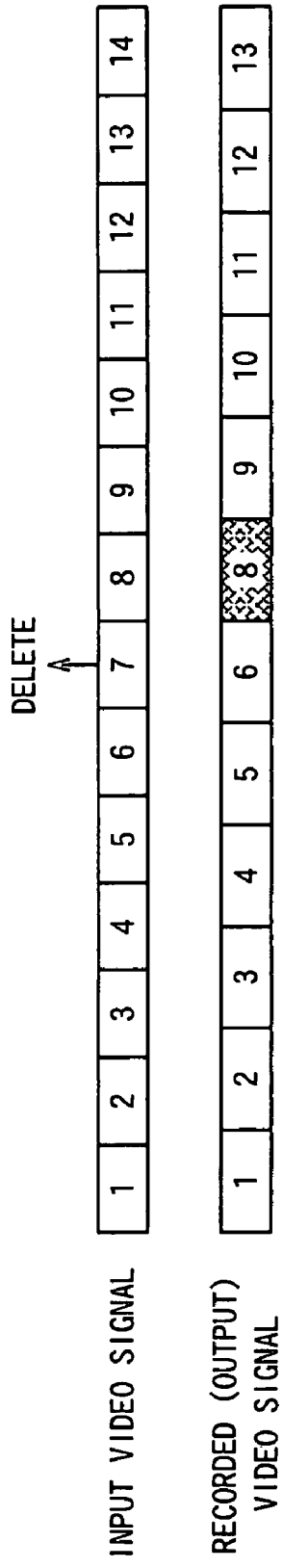

FIG.3A

INPUT VIDEO SIGNAL

| Frame | 1 | 2 | 3 | 4 | 5 | 6 | 7 | 8 | 9 |
|---|---|---|---|---|---|---|---|---|---|
| VBI | AB | CD | EF | GH | Null | Cont.1 | Cont.1 | IJ | KL |

FIG.3B

TO-BE-RECORDED (OUTPUT) VIDEO SIGNAL

| Frame | 1 | 2 | 3 | 4 | 5 | 6 | 7 | 8 | 9 |
|---|---|---|---|---|---|---|---|---|---|
| VBI | AB | CD | EF | GH | Null | Cont.1 | Cont.1 | IJ | KL |

↑ COPIED FRAME (frame 2: Null)

FIG.3C

TO-BE-RECORDED (OUTPUT) VIDEO SIGNAL

| Frame | 1 | 2 | 3 | 4 | 5 | 6 | 7 | 8 | 9 |
|---|---|---|---|---|---|---|---|---|---|
| VBI | AB | CD | Null | EF | GH | Cont.1 | Null | IJ | KL |

↑ COPIED FRAME (frames 6,7)

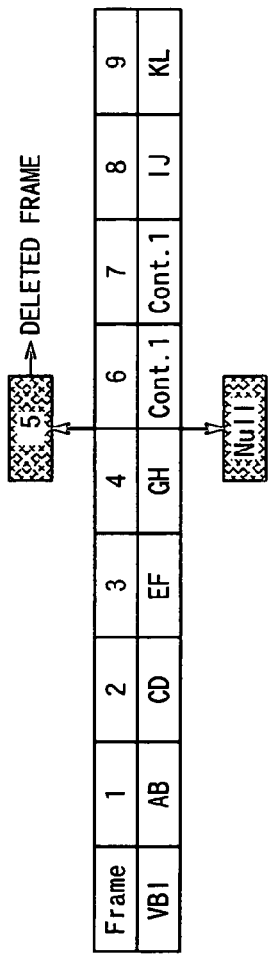
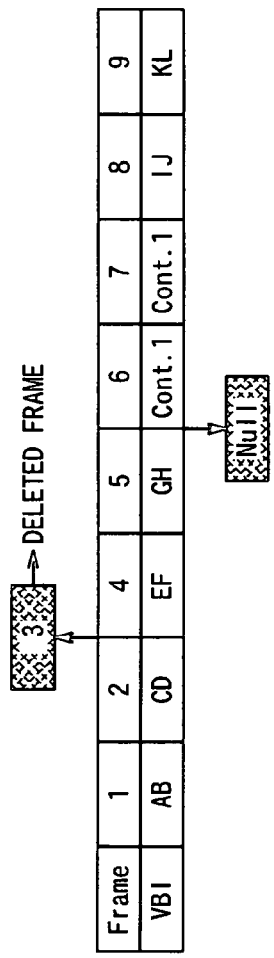

VIDEO RECORDING APPARATUS AND METHOD, AND VIDEO OUTPUT APPARATUS AND METHOD

BACKGROUND OF THE INVENTION

1. Field of the Invention

The present invention relates to a video recording apparatus and method, and a video output apparatus and method, in which television signals based on a predetermined standard such as NTSC or the like are supplied, and the supplied TV signals are digitally encoded for recording to a recording medium such as a DVD (digital versatile disk).

This application claims the priority of the Japanese Patent Application No. 2003-107053 filed on Apr. 10, 2003, the entirety of which is incorporated by reference herein.

2. Description of the Related Art

As a device for recording TV broadcast programs or photographed images, DVD recorders each using a recording DVD as a recording medium have become popular, taking the place of the conventional video tape recorders. The recording DVD is an optical disk of 12 cm in diameter and 1.2 mm in thickness and has a recording capacity of 4.7 giga-bytes.

There have been proposed recording DVDs of five formats including DVD-R, DVD-RW, DVD+RW, DVD+R and DVD-RAM. "R" stands for "recordable ("write once, read many)" and "RW" stands for "rewritable (rewritable more than once)". These formats were proposed by the consumer specification association "DVD Forum" (Internet address: URL: http://www.dvdforum.gr.jp/) and another consumer specification association "DVD+RW Alliance" (Internet address: URL:http://www.dvdrw.com/).

Also, the above DVD specifications adopt the MPEG-2 technique for video and audio encoding. A DVD recorder encodes input video and audio signals by compression with the MPEG-2 technique to create an MPEG-2 data stream, and makes authoring of the MPEG-2-based data stream for recording to a DVD.

Also, for recording NTSC-based TV signals by the DVD recorder, an asynchronous system is applied not to synchronize the vertical sync timing (V timing) of an input signal with the V timing of the MPEG-2 data to be recorded in some cases.

In the above asynchronous system, in case the V timing of the signal to be recorded is shorter in cycle than that of the input video signal (namely, the recording clock is earlier), an underflow that "a frame not yet supplied has to be outputted" takes place at a time. At this time, a shift between the V timing of the input video signal and that of the signal to be recorded is adjusted by outputting a precedent frame repeatedly as the case may be. Such an adjustment is called "frame repeat".

On the contrary, in case the V timing of the signal to be recorded is longer in cycle than that of the input video signal (namely, the recording clock is later), an overflow that "a preceding frame is not yet outputted but a next frame is inputted" takes place at a time. At this time, a shift between the V timing of the input video signal and that of the signal to be recorded is adjusted. This adjustment is called "frame skip".

The TV signal broadcasting methods include a "video multiplexing telecasting" or "teletext" in which a closed caption, text information, data for controlling the closed caption and text information, etc. are inserted in a predetermined horizontal scan period within a vertical blanking time (on a twenty-first horizontal line, for example). Information for insertion into the horizontal scan period within the vertical blanking time is generally called "vertical blanking information (VBI)". In the video multiplex telecasting or teletext, VBI is transmitted over a succession of frames and the frames as a whole defines the VBI.

When recording a TV signal including such VBI, the DVD recorder detects the VBI while the VBI is still a NTSC-based or PAL-based TV signal, and encodes the detected VBI into a header of each GOP of an MPEG-2 data stream.

Note here that in case the aforementioned frame repeat or frame skip has occurred, the VBI inserted in a blanking time, for example, will also be repeated similarly to the frames or arbitrary data thereof have deleted. Thus, the VBI will lose continuity, for example, character data will be garbled and become meaningless.

OBJECT AND SUMMARY OF THE INVENTION

It is therefore an object of the present invention to overcome the above-mentioned drawbacks of the related art by providing a video recording apparatus and method, and a video output apparatus and method, in which even if a frame repeat or frame skip occurs, additional information inserted in a predetermined horizontal scan period within a vertical blanking time can be kept continuous to permit recording and outputting of a video signal.

The above object can be attained by providing a video recording apparatus including, according to the present invention: a TV signal decoding means for converting an input TV signal based on a predetermined TV system into a predetermined digital video signal; a video encoding means for encoding the digital video signal into a video data stream in a predetermined format; a recording means for recording the video data stream to a recording medium; a blanking information detecting means for detecting blanking data included in a predetermined horizontal scan period within a vertical blanking time of each frame of the TV signal; and a controlling means for encoding the detected blanking data for the video data stream, the controlling means inserting null data as blanking data into an arbitrary frame in case the video encoding means has inserted one frame into the video data stream in arbitrary timing correspondingly to the fact that the vertical sync period of the video data stream is shorter than that of the TV signal.

Also, the above object can be attained by providing a video recording apparatus including, according to the present invention: a TV signal decoding means for converting a TV signal based on a predetermined TV system into a predetermined digital video signal; a video encoding means for encoding the digital video signal into a video data stream in a predetermined format; a recording means for recording the video data stream to a recording medium; a blanking information detecting means for detecting blanking data included in a predetermined horizontal scan period within the vertical blanking time of each frame of the TV signal; and a controlling means for encoding the detected blanking data for the video data stream, the controlling means deleting, in case the video encoding means encodes the video data stream with one frame being deleted in arbitrary timing correspondingly to the fact that the vertical sync period of the video data stream is longer than that of the TV signal, one null data from blanking data inserted in a frame following the deleted frame.

Also, the above object can be attained by providing a video recording method including, according to the present invention, the steps of: supplying a TV signal based on a predetermined TV system; converting the input TV signal into a predetermined digital video signal; encoding the digital video signal into a video data stream in a predetermined format; detecting blanking data included in a predetermined horizontal scan period within the vertical blanking time of each frame of the input TV signal; encoding the detected blanking data for the video data stream; and recording the video data stream to a recording medium, null data being inserted, for encoding the blanking data for the video data stream, as blanking data into an arbitrary frame in case one frame is inserted into the video data stream in arbitrary timing correspondingly to the fact that the vertical sync period of the video data stream is shorter than that of the TV signal.

Also, the above object can be attained by providing a video recording method including, according to the present invention, the steps of: supplying a TV signal based on a predetermined TV system; converting the input TV signal into a predetermined digital video signal; encoding the digital video signal into a video data stream in a predetermined format; detecting blanking data included in a predetermined horizontal scan period within the vertical blanking time of each frame of the input TV signal; encoding the detected blanking data for the video data stream; and recording the video data stream to a recording medium, one null data being deleted, for encoding the blanking data for the video data stream, from blanking data inserted in a frame following the deleted frame in case the video data stream is encoded with one frame being deleted in arbitrary time correspondingly to the fact that the vertical sync period of the video data stream is longer than that of the TV signal.

Also, the above object can be attained by providing a video output apparatus including according to the present invention: a TV signal decoding means for converting an input TV signal based on a predetermined TV system into a predetermined digital video signal; a TV signal encoding means for converting the digital video signal into a TV signal based on a predetermined TV system and outputting the TV signal resulted from the conversion; a blanking information detecting means for detecting blanking data included in a predetermined horizontal scan period within the vertical blanking time of each frame of the TV signal; and a controlling means for encoding the detected blanking data for the output TV signal, the controlling means inserting null data as blanking data into an arbitrary frame in case the TV signal encoding means inserts one frame into the output TV signal in arbitrary timing correspondingly to the fact that the vertical sync period of the output TV signal is shorter than that of the input TV signal.

Also, the above object can be attained by providing a video output apparatus including according to the present invention: a TV signal decoding means for converting an input TV signal based on a predetermined TV system into a predetermined digital video signal; a video encoding means for converting the digital video signal into a video data stream in a predetermined format; a blanking information detecting means for detecting blanking data included in a predetermined horizontal scan period within the vertical blanking time of each frame of the TV signal; and a controlling means for encoding the detected blanking data for the output TV signal, the controlling means deleting, in case the TV signal encoding means outputs a TV signal with one frame being deleted in arbitrary timing correspondingly to the fact that the vertical sync period of the output TV signal is shorter than that of the input TV signal, one null data from blanking data inserted in a frame following the deleted frame.

Also, the above object can be attained by providing a video output method including, according to the present invention, the steps of: supplying a TV signal based on a predetermined TV system; converting the input TV signal into a predetermined digital video signal; detecting blanking data included in a predetermined horizontal scan period within the vertical blanking time of each frame of the input TV signal; converting the digital video signal into a TV signal based on a predetermined TV system and outputting the TV signal resulted from the conversion; encoding the detected blanking data for the output TV signal, null data being inserted, for outputting the TV signal, as blanking data into an arbitrary frame in case one frame is inserted into the output TV signal in arbitrary timing correspondingly to the fact that the vertical sync period of the output TV signal is shorter than that of the input TV signal.

Also, the above object can be attained by providing a video output method including, according to the present invention, the steps of: supplying a TV signal based on a predetermined TV system; converting the input TV signal into a predetermined digital video signal; detecting blanking data included in a predetermined horizontal scan period within the vertical blanking time of each frame of the input TV signal; converting the digital video signal into a TV signal based on a predetermined TV system and outputting the TV signal resulted from the conversion; and encoding the detected blanking data for the output TV signal, one null data being deleted, for outputting the TV signal, in case the TV signal is outputted with one frame being deleted in arbitrary time correspondingly to the fact that the vertical sync period of the output TV signal is shorter than the vertical sync period of the input TV signal, from blanking data inserted in a frame following the deleted frame.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIG. 2 explains the frame repeat and frame skip;

FIG. 3 explains how to insert VBI when a frame repeat has occurred; and

FIG. 4 explains how to delete VBI when a frame skip has occurred.

DETAILED DESCRIPTION OF THE PREFERRED EMBODIMENTS

Figure 1:
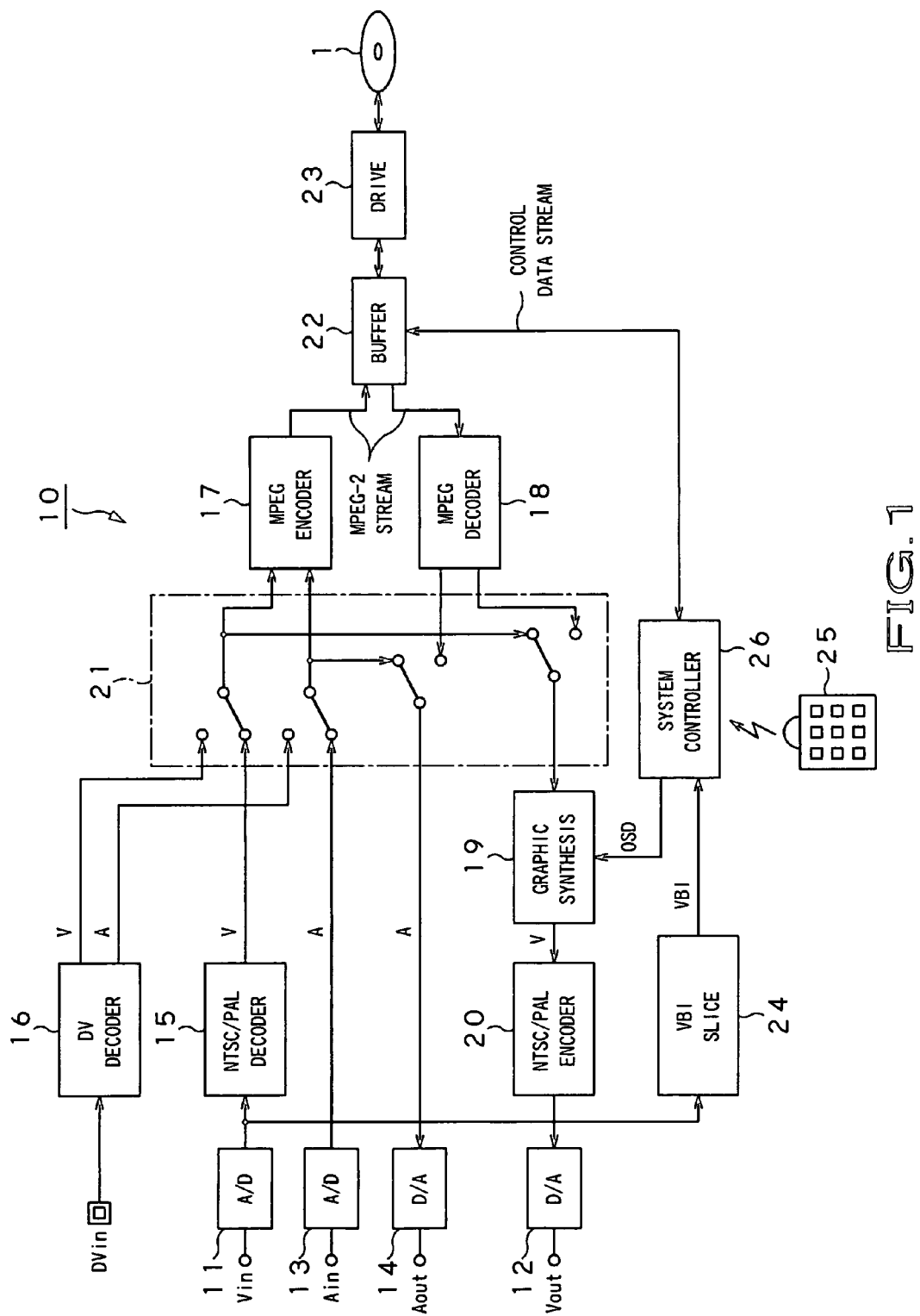
FIG. 1 is a block diagram of a DVD recorder as an embodiment of the present invention.

The present invention will be described in detail concerning a DVD recorder as an embodiment of the present invention.

Referring now to FIG. 1, there is illustrated in the form of a block diagram the DVD recorder according to the present invention. The DVD recorder is generally indicated with a reference 10.

The DVD recorder 10 records a TV broadcast program data or AV (video/audio) signal read from a recording tape to a DVD disk, and reads and outputs AV signal from the DVD disk.

The DVD recorder 10 is a multi-purpose disk recorder compatible with DVD-VIDEO, DVD-R and DVD-RW proposed by the aforementioned by consumer specification association "DVD Forum" and DVD+R and DVD+RW proposed by the aforementioned consumer specification association "DVD+RW Alliance". These types of DVD disks recordable and playable by the DVD recorder 10 will be generically referred to as "DVD disk 1" wherever appropriate.

The internal construction of the DVD recorder 10 will be explained with reference to FIG. 1.

As shown, the DVD recorder 10 includes a video input terminal Vin, audio input terminal Ain, video output terminal Vout, audio output terminal Aout, digital interface terminal DVin, video A-D converter 11, video D-A converter 12, audio A-D converter 13, and an audio D-A converter 14.

The above video input terminal Vin is connected by a video cable to a tuner, set top box, video player or the like. The video input terminal Vin is supplied with a video signal that is a video signal in a predetermined video format such as NTSC, PAL or the like from such devices. It should be noted that the video signal supplied to the video input terminal Vin is converted from analog to digital by the video A-D converter 11 before being supplied to inside the DVD recorder 10. The above video output terminal Vout is connected by a video cable to a TV monitor, video recorder or the like. The video output terminal Vout delivers a video signal in a predetermined video format such as NTSC, PAL or the like to such devices. It should be noted that the video signal delivered at the video output terminal Vout is converted from digital to analog by the video D-A converter 12 before being delivered to outside the DVD recorder 10.

The above audio input terminal Ain is connected by an audio player to a tuner, set top box, audio player or the like. The audio input terminal Ain is supplied with an audio signal that is a sound and music signal in a predetermined format from one of such devices. It should be noted that the audio signal supplied to the audio input terminal Ain is converted from analog to digital by the audio A-D converter 13 before being supplied to inside the DVD recorder 10. The above audio output terminal Aout is connected by an audio cable to an audio device, audio recorder or the like. The audio output terminal Aout delivers an audio signal in a predetermined format, for example, to such devices. It should be noted that the audio signal delivered at the audio output terminal Aout is converted from digital to analog by the audio D-A converter 14 before being delivered to outside the DVD recorder 10.

The above digital interface terminal DVin is connected by a digital data transmitting interface cable such as an IEEE 1394 terminal, USB or the like to a DVD player that reproduces AV data (video and audio data) from a DV tape cassette. The digital interface terminal DVin is supplied with AV data (will be referred to as "DV data" hereunder) in a DV format, the DV player has read from the DV tape cassette.

As shown in FIG. 1, the DVD recorder 10 includes also an NTSC/PAL decoder 15, DV decoder 16, MPEG encoder 17, MPEG decoder 18, graphic synthesis circuit 19 and an NTSC/PAL encoder 20.

The above NTSC/PAL decoder 15 converts a video signal in the NTSC or PAL format, supplied from the video input terminal Vin and digitized by the video A-D converter 11, into a video signal in the ITU-R BT. 601 format.

The above DVD decoder 16 converts the DV data supplied from the digital interface terminal DVin into video signal in the ITU-R BT. 601 format and audio signal in a predetermined format.

The above MPEG encoder 17 is supplied with the video signal in the ITU-R BT. 601 format and audio signal in the predetermined format, digitized by the audio A-D converter 13, and encodes these video and audio signals by compression with the MPEG-2 technique to provide MPEG-2-based AV data stream (will be referred to as "MPEG-2 stream" hereunder).

The above MPEG decoder 18 is supplied with the MPEG-2 stream and decoded by decompression (expansion) to provide a video signal in the ITU-R BT. 601 format and audio signal in a predetermined format.

The above graphic synthesis circuit 19 synthesizes an external on-screen display image on a display screen for the video signal in the ITU-R BT. 601 format.

The above NTSC/PAL encoder 20 converts the video signal in the ITU-R BT. 601, supplied from the graphic synthesis circuit 19 into a video signal in the NTSC or PAL format and delivers it at the video output terminal Vout.

As shown in FIG. 1, the DVD recorder 10 includes also a switching circuit 21 that selects a transmission path for video and audio signals.

The above switching circuit 21 selects a transmission path for each of recording and playback. When it has selected a transmission path for recording, it will further select a transmission path for input of each of DV data and other signal.

More specifically, the switching circuit 21 selects a transmission path as follows. For recording any other signal than DV data, the switching circuit 21 selects a transmission path along which a video signal supplied from the NTSC/PAL decoder 15 will be passed to the MPEG encoder 17 and graphic synthesis circuit 19 while an audio signal supplied from the audio A-D converter 13 will be passed to the MPEG encoder 17 and audio A-D converter 14. For recording DV data, the switching circuit 21 selects a transmission path along which a video signal supplied from the DV decoder 16 will be passed to the MPEG encoder 17 and graphic synthesis circuit 19 while an audio signal supplied from the DV decoder 16 will be passed to the MPEG encoder 17 and audio D-A converter 14. For playback, the switching circuit 21 selects a transmission path along which a video signal supplied from the MPEG decoder 18 will be passed to the graphic synthesis circuit 19 while an audio signal supplied from the MPEG decoder 18 will be passed to the audio D-A converter 14.

As shown in FIG. 1, the DVD recorder 10 includes also a buffer circuit 22 and a drive unit 23.

The above buffer circuit 22 is a memory to temporarily store MPEG-2 stream and control data stream, that are written to or read from the DVD disk 1. The above drive unit 23 has the DVD disk 1 loaded therein, and makes a physical access to the loaded DVD disk 1 to write or read data to or from the latter. It should be noted that the "control data stream" is a data stream containing information defined in the format of the DVD disk 1.

As shown in FIG. 1, the DVD recorder 10 includes also a VBI slice circuit 24.

The above BVI slice circuit 24 is to detect information (VBI) included in the blanking time of a video signal from a video signal supplied from the video input terminal Vin.

As shown in FIG. 1, the DVD recorder 10 includes also an input device 25 and a system controller 26.

The above input device 25 is an infrared remote controller or the like to be operated by the user to input information intended for operating the DVD recorder 10. Information supplied from the input device 25 is supplied to the system controller 26.

The above system controller 26 is a control block composed of a microcomputer to set and control each of the aforementioned component circuits and the like.

More specifically, the system controller 26 operates as follows:

For example, the system controller 26 reads the control data stream from the buffer circuit 22 and controls, on the basis of the control data, access to the DVD disk 1, display on a TV monitor and the like. At start or end of recording data, the system controller 26 generates control information for data going to be recorded or having been recorded, and writes the control information as a data stream in a format to the DVD disk 1. The system controller 26 generates and analyzes header information of the MPEG-2 stream.

Also, the system controller 26 generates an OSD image such as a menu screen or the like, supplies the OSD image thus generated to the graphic synthesis circuit 19 and displays the OSD image on a TV monitor. Further, the system controller 26 updates the OSD image appropriately according to input information from the input device 25, and displays the updated OSD image on the TV monitor. Moreover, the system controller 26 makes a variety of control operations corresponding to input information from the input device 25 and a predetermined control that depends upon a currently displayed OSD image and currently supplied input information.

Further, the system controller 26 is supplied with VBI detected in an input video signal supplied from the VBI slice circuit 24, and supplies necessary one of multiple pieces of information included in the VBI to the MPEG encoder 17 to have the latter encode the input VBI into header information for the MPEG-2 stream. When the DVD recorder 10 is in the playback mode, the system controller 26 generates VBI on the basis of the necessary one of the information detected in the header information of the MPEG-2 stream, and supplies the VBI to the NTSC/PAL encoder 20 to have the latter encode the VBI into a predetermined blanking position for a video signal to be outputted.

The DVD recorder 10 constructed as above operates as will be described below in the recording mode.

When in the recording mode, the DVD recorder 10 is supplied with external video and audio signals. The input video signal is converted by the NTSC/PAL decoder 15 or DV decoder 16 into a video signal in the ITU-R BT. 601 format. The video signal in the ITU-R BT. 601 format is supplied to the MPEG encoder 17 via the switching circuit 21, and encoded along with the audio signal into an MPEG-2 stream. The buffer circuit 22 provisionally stores the MPEG-2 stream encoded by the MPEG encoder 17 while provisionally storing a control data stream generated by the system controller 26. Then in the DVD recorder 10, the drive unit 23 will read the MPEG-2 stream and control data stream from the buffer circuit 22, and write the read data to the DVD disk 1, in a sequence based on the format of the DVD disk 1.

Also, the DVD recorder 10 operates as follows to allow the user to make real-time EE monitoring of an image and sound being recorded.

The video signal converted by the NTSC/PAL decoder 15 or DV decoder 16 into the ITU-R BT. 601 format is also supplied to the graphic synthesis circuit 19 via the switching circuit 21. The video signal supplied to the graphic synthesis circuit 19 is combined with an OSD image, if any supplied from the system controller 26, or supplied as it is to the NTSC/PAL encoder 20 if no OSD image is supplied from the system controller 26. The video signal in the ITU-R BT. 601 format, supplied to the NTSC/PAL encoder 20 is converted into a video signal in the NTSC or PAL format, and then into an analog signal before being delivered to outside the DVD recorder 10. Also, the input audio signal is converted into an analog signal before being delivered to outside the DVD recorder 10 via the switching circuit 21.

When in the playback mode, the DVD recorder 10 operates as follows:

When the DVD recorder 10 is in the playback mode, the drive unit 23 reads the MPEG-2 stream and control data stream from the DVD disk 1, and stores them into the buffer circuit 22. From the buffer circuit 22, the MPEG-2 stream is read by the MPEG decoder 18, while the control data stream is read by the system controller 26. The MPEG-2 stream thus read is decoded by the MPEG decoder 18 into video and audio signals in the ITU-R BT. 601 format. The audio signal thus decoded is converted into an analog signal before being delivered to outside the DVD recorder 10 via the switching circuit 21. The video signal in the ITU-R BT. 601 format is supplied to the graphic synthesis circuit 19 via the switching circuit 21. The video signal supplied to the graphic synthesis circuit 19 is combined with an OSD image, if any supplied from the system controller 26, or supplied as it is to the NTSC/PAL encoder 20 if no OSD image is supplied from the system controller 26. The video signal in the ITU-R BT. 601 format supplied to the NTSC/PAL encoder 20 is converted into a video signal in the NTSC or PAL format, and converted into an analog signal before being delivered to outside the DVD recorder 10. Also, the system controller 26 controls, according to the control data stream read from the DVD disk 1, reading position on the DVD disk and a variety of display operations.

(Frame Repeat and Frame Skip)

Next, the frame repeat and frame skip will be described.

In the DVD recorder 10, the vertical sync timing (V timing) of the video signal supplied from the video input terminal 11 is not synchronized with that of the video signal to be encoded by the MPEG encoder 17 (recording video signal). Namely, the DVD recorder 10 is an asynchronous system. Also, the video signal supplied from the video input terminal 11 (input video signal) and video signal delivered for EE monitoring at the video output terminal 13 (output video signal) are not synchronized with each other.

Thus in the DVD recorder 10 being in the recording mode, the MPEG encoder 17 and NTSC/PAL encoder 20 make frame repeat and frame skip, respectively, under the control of the system controller 26. It should be noted that the MPEG encoder 17 and NTSC/PAL encoder 20 make the frame repeat and frame skip in timings, respectively, independent of each other.

FIG. 2 explains the frame repeat and frame skip. FIG. 2A shows the frame repeat. The frame repeat takes place when the V timing of the signal to be recorded (or output video signal) is shorter in cycle than that of the input video signal. The frame repeat is to adjust, in case an underflow that "a frame not yet supplied has to be outputted" has occurred as shown at the first and seventh frames in FIG. 2A, a shift in V timing between the input video signal and signal to be recorded by copying a precedent frame and repeatedly outputting the frame.

FIG. 2B shows the frame skip. The frame slip takes place in case the V timing of the signal to be recorded (or output video signal) is longer in cycle than that of the input video signal. This frame skip is to adjust, in case an overflow that "a frame is not yet outputted but a next frame is inputted" has occurred as shown at the seventh frame in FIG. 2B, a shift in V timing between the input signal and signal to be recorded by deleting the frame not yet outputted.

Also, if a frame repeat has occurred, the MPEG encoder 17 and NTSC/PAL encoder 20 insert VBI as shown in FIG. 3. FIG. 3A shows VBI inserted in an input video signal, FIG. 3B shows VBI to be inserted into a video signal to be recorded (output video signal) when a normal frame repeat has occurred with the input video signal in FIG. 3A, and FIG. 3C shows VBI to be inserted into the video signal to be recorded (output video signal) when a special frame repeat has occurred with the input video signal in FIG. 3A. It should be noted that in FIG. 3, frame numbers are shown in the upper case and VBI inserted in the frames are shown in the lower case.

First, in case a normal frame repeat has occurred, a copied frame will be inserted after the second frame as in FIG. 3B and the same frame be outputted successively twice. Null code (a code meaning that there is no information; 0x8080) is stated in VBI inserted into the copied frame.

However, in case a frame having control code (Cont. 1), not any text information, inserted therein is copied by the frame repeat and inserted after the sixth frame as in FIG. 3C, the control code will be inserted as it is in the copied frame and null code be inserted a frame next to the inserted frame (seventh frame in FIG. 3C).

In the teletext broadcasting standard in the United States of America, it is stipulated that various control codes such as "roll up text", "load subtitle", etc. shall be inserted along with text information. Also, the above teletext broadcasting standard stipulates that in case such control codes are inserted in two successive frames, a control operation shall be done only once regarding the receiving side (decoder) the control codes as one control code. Thus, if a frame repeat occurs between two successive frames to insert null code between the control codes, a control operation will be done twice though it is stipulated that the control operation shall be done only once. On this account, an operation as shown in FIG. 3C is effected in the DVD recorder 10.

With the aforementioned operations, the DVD recorder 10 can record and output a video signal with security of the continuity of VBI even if a frame repeat takes place.

In case a frame skip has occurred, the MPEG encoder 17 and NTSC/PAL encoder 20 encode VBI as shown in FIG. 4. FIG. 4A shows VBI information inserted in an input video signal, FIG. 4B shows VBI inserted into a video signal to be recorded (output video signal) when a normal frame skip has occurred with the input video signal in FIG. 4A, and FIG. 4C shows VBI information inserted into the video signal to be recorded (output video signal) when a special frame skip has occurred with the input video signal in FIG. 4A. It should be noted that in FIG. 4, frame numbers are shown in the upper case and VBI information inserted in the frames are shown in the lower case.

First, in case a normal frame skip has occurred, a skipped frame (frame No. 5, for example, as in FIG. 4B) will be deleted. However, when VBI inserted in the deleted frame is null code (a code meaning that there is no information), the null code is also deleted at the same time.

However, in case a frame (frame No. 3, for example, as in FIG. 4C) having inserted therein other information than null code has been deleted by the frame skip, there will be deleted a null code nearest to the other information and inserted in a frame following the deleted frame (null code in the frame No. 5, for example, as in FIG. 4C). Then, VBI information inserted in the deleted frame is slid to a frame next to the deleted frame and VBI in frames including from the deleted frame to the frame having the null code inserted therein is slid frame by frame.

With the aforementioned operations, the DVD recorder 10 can record and output a video signal with security of the continuity of VBI even if a frame skip takes place.

As having been described in the foregoing, the DVD recorder 10 according to the present invention can record video signals to a DVD with security of the continuity of VBI inserted in a predetermined horizontal scan period within a vertical blanking time even if a frame repeat or skip occurs.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

In the video recording apparatus and method, and the video output apparatus and method, according to the present invention, in which one null data is inserted into an arbitrary frame as blanking data to be inserted in a horizontal scan period within a vertical blanking time in case a frame repeat is done correspondingly to the fact that the vertical sync period of a video data stream to be recorded to a recording medium or an output TV signal is shorter than that of an input TV signal.

In the video recording apparatus and method according to the present invention, one null data is deleted from blanking data to be inserted in a horizontal scan period within a vertical blanking time in case a frame skip is done correspondingly to the fact that the vertical sync period of a video data stream to be recorded to a recording medium or an output TV signal is longer than that of an input TV signal.

According to the present invention having been described in the foregoing, a video signal can be recorded or outputted with security of the continuity of additional information to be inserted in a predetermined horizontal scan period in a vertical blanking time even if a frame repeat or skip takes place.

What is claimed is:

1. A video recording apparatus comprising:
   TV signal decoding means for converting an input TV signal consistent with a TV broadcast protocol into a digital video signal, the input TV signal having a first frame period;
   video encoding means for encoding, according to a second frame period that is shorter than the first frame period, the digital video signal into a video data stream having a predetermined format;
   means for recording the video data stream to a recording medium;
   means for detecting textual data included in a horizontal scan period within a vertical blanking interval of each frame of the TV signal; and
   controlling means for:
      encoding the detected textual data for into the video data stream, and
      inserting a null code as textual data into a horizontal scan period within a vertical blanking interval of a frame in the video data stream when the video encoding means inserts a first duplicate of a frame from the input TV signal into the video data stream, while the video data stream is encoded, as a result of the difference between the first frame period and the second frame period.

2. The apparatus as set forth in claim 1, wherein the controlling means inserts the null code into the first duplicate frame.

3. The apparatus as set forth in claim 2, wherein:
   the TV broadcast protocol requires that when two successive frames of the input TV signal contain identical control codes as textual data in horizontal scan periods within vertical blanking intervals of the two successive frames, a control corresponding to the control code should be executed only once by the TV signal decoding means; and
   when the first duplicate frame is inserted between the two successive frames, the controlling means inserts the control code as textual data into the first duplicate frame, and inserts a null code as textual data into a horizontal scan period within a vertical blanking interval of a frame following the first duplicate frame.

4. The apparatus as set forth in claim 1, further comprising a TV signal encoding means for converting, according to a third frame period that is shorter than the first frame period, the digital video signal into an output TV signal consistent with a TV broadcast protocol, wherein the controlling means inserts a null data code as textual data into a horizontal scan period within a vertical blanking interval of a frame of the output TV signal when the TV signal encoding means inserts a second duplicate of a frame of the input TV signal into the output TV signal, while converting the digital video signal to the output TV signal, as a result of the difference between the first frame period and the third frame period.

5. The apparatus as set forth in claim 4, wherein the controlling means inserts the null code as textual data into the second duplicate frame.

6. The apparatus as set forth in claim 5, wherein:
the TV broadcast protocol requires that when two successive frames of the output TV signal contain identical control codes in horizontal scan periods within vertical blanking intervals of the two successive frames, a control corresponding to the control code should be executed only once by the TV signal decoding means; and
when the second duplicate frame is inserted between the two successive frames, the controlling means inserts the control code as textual data into a horizontal scan period within a vertical blanking interval of the second duplicate frame, and inserts a null code as textual data into a horizontal scan period within a vertical blanking interval of a frame following the second duplicate frame.

7. A video recording apparatus comprising:
TV signal decoding means for converting an input TV signal consistent with a TV broadcast protocol into a digital video signal, the input TV signal having a first frame period;
video encoding means for encoding, according to a second frame period that is longer than the first frame period, the digital video signal into a video data stream having a predetermined format;
means for recording the video data stream to a recording medium;
means for detecting textual data included in a horizontal scan period within the vertical blanking interval of each frame of the TV signal; and
controlling means for:
encoding the detected textual data into the video data stream; and
when the video encoding means skips a first frame contained in the input TV signal, while encoding the video data stream, as a result of the difference between the first frame period and the second frame period, the controlling means deletes a null code contained as textual data in a horizontal scan period within a vertical blanking interval of a frame following the first skipped frame.

8. The apparatus as set forth in claim 7, wherein the controlling means further:
shifts back, frame-by-frame, textual data contained in horizontal scan periods within vertical blanking intervals of frames in the video data stream, from the first skipped frame to the frame from which the null data was deleted.

9. The apparatus as set forth in claim 7, further comprising a TV signal encoding means for converting, according to a third frame period that is shorter than the first frame period, the digital video signal into an output TV signal consistent with a TV broadcast protocol, wherein when the TV signal encoding means skips a second frame contained in the input TV signal, while converting the digital video signal to the output TV signal, as a result of the difference between the first frame period and the third frame period, the controlling means deletes a null code contained as textual data in a horizontal scan period within a vertical blanking interval of a frame following the second skipped frame.

10. The apparatus as set forth in claim 9, wherein the controlling means further shifts back, frame-by-frame, textual data contained in horizontal scan periods within vertical blanking intervals of frames in the output TV signal, from the second skipped frame to the frame from which the null code was deleted.

11. A video recording method comprising the steps of:
supplying an input TV signal based on a TV broadcast protocol, the input TV signal having a first frame period;
converting the input TV signal into a digital video signal;
encoding, according to a second frame period that is shorter than the first frame period, the digital video signal into a video data stream having a predetermined format;
detecting textual data included in a horizontal scan period within a vertical blanking interval of each frame of the input TV signal;
encoding the detected textual data into the video data stream;
recording the video data stream to a recording medium; and
inserting a null code as textual data into a horizontal scan period within a vertical blanking interval of a frame in the video data stream when a first duplicate of a frame from the input TV signal is inserted into the video data stream, while the video data stream is encoded, as a result of the difference between the first frame period and the second frame period.

12. The method as set forth in claim 11, wherein the null code is inserted into the first duplicate frame.

13. The method as set forth in claim 12, wherein:
the TV broadcast protocol requires that when two successive frames of the input TV signal contain identical control codes in horizontal scan periods within vertical blanking intervals of the two successive frame, a control corresponding to the control code should be executed only once; and
when the first duplicate frame is inserted between the two successive frames, the control code is inserted as textual data into a horizontal scan period within a vertical blanking interval of the first duplicate frame, and a null code is inserted into a horizontal scan period within a vertical blanking interval of a frame following the first duplicate frame.

14. The method as set forth in claim 11, further comprising:
converting, according to a third frame period that is shorter than the first frame period, the digital video signal into an output TV signal consistent with a TV broadcast protocol; and
inserting a null code into a horizontal scan period within a vertical blanking interval of a frame of the output TV signal when a second duplicate frame is inserted into the output TV signal, while the digital video signal is converted to the output TV signal, as a result of the difference between the first frame period and the third frame period.

15. The method as set forth in claim 14, wherein the null code is inserted into the second duplicate frame.

16. The method as set forth in claim 15, wherein:
the TV broadcast protocol requires that when two successive frames of the output TV signal have identical control codes contained in horizontal scan periods within vertical blanking intervals of the two successive frames, a control corresponding to the control code should be executed only once; and
when the second duplicate frame is inserted between the two successive frames, the control code is inserted as textual data into the second duplicate frame, and a null code is inserted as textual data into a horizontal scan period within a vertical blanking interval of a frame following the second duplicate frame.

17. A video recording method comprising the steps of:
supplying an input TV signal based on a predetermined TV broadcast protocol, the input TV signal having a first frame period;
converting the input TV signal into a digital video signal;
encoding, according to a second frame period that is longer than the first frame period, the digital video signal into a video data stream having a predetermined format;
detecting textual data included in a horizontal scan period within a vertical blanking interval of each frame of the input TV signal;
encoding the detected textual data into the video data stream;
recording the video data stream to a recording medium; and
when a first frame contained in the input TV signal is skipped, while the video data stream is encoded, as a result of the difference between the first frame period and the second frame period, deleting a null code contained in a horizontal scan period within a vertical blanking interval of a frame following the first skipped frame in the video data stream.

18. The method as set forth in claim 17, further including:
shifting back, frame-by-frame, textual data contained in horizontal scan periods within vertical blanking intervals of frames in the video data stream from the first skipped frame to the frame from which the null code was deleted.

19. The method as set forth in claim 17, further comprising:
converting, according to a third frame period that is shorter than the first frame period, the digital video signal into an output TV signal consistent with a TV broadcast protocol;
outputting the TV signal; and
when a second frame contained in the input TV signal is skipped, while the digital video signal is converted into the output TV signal, as a result of the difference between the first frame period and the third frame period, deleting a null code from a horizontal scan period within a vertical blanking interval of a frame following the second skipped frame.

20. The method as set forth in claim 19, further including:
shifting back, frame-by-frame, textual data contained in horizontal scan periods within vertical blanking intervals of frames in the output TV signal from the second skipped frame to the frame from which the null was deleted.

21. A video output apparatus comprising:
TV signal decoding means for converting an input TV signal consistent with a TV broadcast protocol into a digital video signal, the input TV signal having a first frame period;
TV signal encoding means for converting, according to a second frame period that is shorter than the first frame period, the digital video signal into an output TV signal consistent with a TV broadcast protocol;
means for detecting textual data included in a horizontal scan period within a vertical blanking interval of each frame of the input TV signal; and
a controlling means for:
encoding the detected textual data for the output TV signal,
inserting a null code into a horizontal scan period within a vertical blanking interval of a frame of the output TV signal when the TV signal encoding means inserts a duplicate of a frame from the input TV signal into the output TV signal, while converting the digital video signal into the output TV signal, as a result of the difference between the first frame period and the second frame period.

22. A video output apparatus comprising:
TV signal decoding means for converting an input TV signal consistent with a TV broadcast protocol into a digital video signal, the input TV signal having a first frame period;
TV signal encoding means for converting, according to a second frame period that is shorter than the first frame period, the digital video signal into an output TV signal consistent with a TV broadcast protocol;
means for detecting textual data included in a horizontal scan period within a vertical blanking interval of each frame of the input TV signal; and
a controlling means for:
encoding the detected textual data for the output TV signal, and
when the TV signal encoding means skips a frame contained in the input TV signal, while the digital video signal is converted to the output TV signal, as a result of the difference between the first frame period and the second frame period, the controlling means deletes a null code contained in a horizontal scan period within a vertical blanking interval of a frame following the skipped frame.

23. A video output method comprising the steps of:
supplying an input TV signal based on a TV broadcast protocol, the input TV signal having a first frame period;
converting the input TV signal into a digital video signal;
detecting textual data included in a horizontal scan period within a vertical blanking interval of each frame of the input TV signal;
converting, according to a second frame period that is shorter than the first frame period, the digital video signal into an output TV signal based on a a TV broadcast protocol;
encoding the detected textual data for the output TV signal; and
inserting a null code into a horizontal scan period within a vertical blanking interval of a frame of the output TV signal when a duplicate frame is inserted into the output TV signal, while the digital video signal is converted into the output TV signal, as a result of the difference between the first frame period and the second frame period.

24. A video output method comprising the steps of:
supplying an input TV signal based on a TV broadcast protocol, the input TV signal having a first frame period;
converting the input TV signal into a digital video signal;

detecting textual data included in a horizontal scan period within a vertical blanking interval of each frame of the input TV signal;

converting, according to a second frame period that is shorter than the first frame period, the digital video signal into an output TV signal based on a TV broadcast protocol;

encoding the detected textual data for the output TV signal; and when a frame contained in the input TV signal is skipped, while the digital video signal is converted to the output TV signal, as a result of the difference between the first frame period and the second frame period, deleting a null code contained in a horizontal scan period within a vertical blanking interval of a frame following the skipped frame.

* * * * *